United States Patent Office 3,215,641
Patented Nov. 2, 1965

3,215,641
PHENOL DERIVATIVE
Albert L. Rocklin, Walnut Creek, and Paul H. Williams, Orinda, Calif., assignors to Shell Oil Company, New York, N.Y., a corporation of Delaware
No Drawing. Filed Nov. 13, 1962, Ser. No. 237,323
11 Claims. (Cl. 252—47.5)

This invention relates to a novel class of phenols. It further relates to compositions containing these compounds and as a major component an organic material normally subject to oxidative deterioration. More specifically, it relates to novel 2-(hydroxybenzylthio)-benzothiazoles and compositions containing them.

Many useful materials such as rubbers, unsaturated hydrocarbons, fats and oils, lubricating oils, polyolefins and the like are subject to oxidative deterioration, particularly at elevated temperatures. This oxidative attack results in the loss of some or all of the desirable properties of these materials. To minimize the effect of such an oxidative attack, many compounds have been proposed as effective stabilizers for organic compositions. The alkylated phenols, such as 2,6-di-tert-butyl-4-methyl-phenol and 2,4-dimethyl-6-tert-butylphenol are among the more satisfactory. However, these compounds, and others, are volatile and are therefore of limited value when the compositions into which they are incorporated are subjected to conditions of elevated temperature in preparation or in use. As a result, a need for stabilizers with decreased volatility has arisen. This need is particularly important with reference to stabilizers for elastomers that are to be cured or molded at high temperature and lubricating oils which are normally subjected to high motor temperatures.

The normal oxidative deterioration of many organic substances appears to be promoted or catalyzed by the presence of traces of many metals. These metallic impurities may result from the catalysts used in the preparation of said organic substance, through the normal process of wear as in an internal combustion engine, or by some other method. Probably one of the most successful methods of lessening the catalytic effect of these metallic traces has been through the use of a metal deactivator. A number of organic heterocyclic compounds have been found to be successful in combating the effects of metallic impurities, but these heterocyclic compounds frequently are limited by high volatility, and compositions containing these materials generally require the inclusion of some other material to serve as an antioxidant.

It is a principal object of this invention to provide a novel class of compounds suitable as stabilizers for organic materials. A further object is to provide a class of stabilizers that exhibit superior properties at elevated temperatures. It is a still further object to provide compositions containing these novel compounds. An additional object is to provide in one compound moieties that will furnish the favorable properties of an antioxidant and of a metal deactivator and also exhibit lowered volatility.

These objects are accomplished through the provision of a novel class of 2-(4-hydroxybenzylthio)-benzothiazoles having the structure

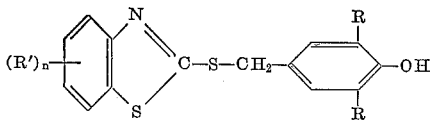

wherein R is alkyl of 1 to 20 carbon atoms, preferably of from 3 to 8 carbon atoms with at least one R being branched on an alpha carbon atom, R′ is alkyl of up to 8 carbon atoms, nitro, or halogen, preferably middle halogen (i.e., chlorine and bromine), and $n$ is a whole number from 0 to 4, inclusive.

For purposes of illustration of the compounds suitable for the invention, the 2-(3,5-dialkyl-4-hydroxybenzyl-thio)-benzothiazoles may be identified by the components from which they are produced, e.g., a 3,5-dialkyl-4-hydroxybenzyl alcohol and a substituted or unsubstituted 2-mercaptobenzothiazole.

A variety of 3,5-dialkyl-4-hydroxybenzyl alcohols may be employed in the preparation of the novel benzothiazoles of the invention. Examples of these are 3,5-dimethyl-4-hydroxybenzyl alcohol; 3-decyl-5-hexyl-4-hydroxybenzyl alcohol; 3-n-amyl-5-octyl-4-hydroxybenzyl alcohol and the like. However, to obtain optimum antioxidant properties, it is desired that the phenolic hydroxyl group be hindered, and thus alkyl groups of up to 8 carbons with at least one of said alkyl groups being branched on the alpha carbon are to be preferred. Exemplary 3,5-dialkyl-4-hydroxybenzyl alcohols of the preferred type are 3-methyl-5-isopropyl-4-hydroxybenzyl alcohol; 3-methyl-5-tert-butyl-4-hydroxybenzyl alcohol; 3,5-di-tert-butyl-4-hydroxybenzyl alcohol; 3-isopropyl-5-tert-amyl-4-hydroxybenzyl alcohol; 3-isopropyl-5-octyl-4-hydroxybenzyl alcohol; 3,5-diisopropyl-4-hydroxybenzyl alcohol and the like.

The 2-mercaptobenzothiazoles suitable for the preparation of the compounds of the invention have the structure

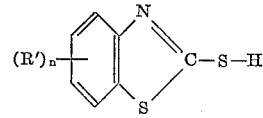

wherein R′ is alkyl of up to 8 carbon atoms, nitro or halogen, selected independently. These compounds can be conveniently prepared for example, by the action of carbon disulfide on aniline and related compounds. Numerous methods for introducing desired substituents on the benzene ring before the formation of the heterocyclic ring will be apparent to one skilled in the art. Thus, compounds such as 2-mercaptobenzothiazole; 6-nitro-2-mercaptobenzothiazole; 5-nitro-6-chloro-2-mercaptobenzothiazole; 5-methyl-2-mercaptobenzothiazole, 6-isopropyl-2-mercaptobenzothiazole; 5-chloro-2-mercaptobenzothiazole; 6-bromo-2-mercaptobenzothiazole; 5,7-dimethyl-2-mercaptobenzothiazole; 4-ethyl-6-tert-butyl-2-mercaptobenzothiazole; 5-methyl-6-nitro-2-mercaptobenzothiazole; 5-chloro-4-methylmercaptobenzothiazole and the like may be prepared and used in the formation of the compounds of the present invention.

In practice, the reaction between the 3,5-dialkyl-4-hydroxybenzyl alcohol and the 2-mercaptobenzothiazole is preferably conducted in the liquid phase in an inert solvent. The reactants are dissolved in a solvent and stirred for a period of several hours in the presence of a catalytic amount of a suitable acid catalyst, e.g., sulfuric acid. Although approximately equimolar amounts of reactants are preferably employed, either may be in excesss. However, for reasons of handling, it is further preferred that approximately stoichiometric amounts of the reagents be used. The reaction may be conducted at any convenient temperature, and temperatures from about 10° to about 80° C., are satisfactory. For simplicity, it is preferred that the reaction be conducted at or near room temperature. The catalyst may be employed in concentrations from about 0.001% to 10% by weight, with concentrations within the range of 0.1% to 5% by weight being preferable. Suitable solvents for the reaction are those solvents capable of dissolving both reactants, inert to reaction conditions, and liquid at the reaction temperature. The class of solvents found to be most satisfactory are the lower alkyl mono- and polyhydric alcohols such as methanol, ethanol, isopropanol, tert-butanol, hexanol, ethylene glycol, glycerol and the like, with tert-butanol being most preferred. As the reaction proceeds, the product precipitates from the reaction solution and is recovered by filtration or other conventional means.

The compounds of the present invention have superior ability for the stabilization of organic materials normally subject to oxidative deterioration. The alkylhydroxybenzylthio substituted benzothiazoles are sufficiently soluble in hydrocarbons such as gasoline, fuel oil and lubricating oils and greases so that they may be employed in stabilizing amounts in such materials. In addition, they are useful as stabilizers in polymerizable olefin monomers where traces of oxygen may bring about undesirable premature polymerization. Examples of these monomers include the vinyl benzenes, acrylates and methacrylates, acrylonitrile and the like.

Typical elastomers in which the substituted benzothiazoles may be employed include natural rubber (*Hevea brasiliensis*) and such synthetic rubbers as styrene/butadiene copolymers, neoprene, polybutadiene, polyisoprene, butyl rubber, and polyacrylonitrile. All of these deteriorate in the presence of oxygen and ozone by hardening, cracking and checking, thereby losing their resilience and mechanical strength. When these rubbers are processed by curing, milling or molding, they are subjected to elevated temperatures and thus tend to volatilize some or all of the stabilizer present in the rubber. However, incorporation of the benzothiazole compounds of the present invention renders the rubbers more resistant to oxidative deterioration. As a result, elastomers stabilized with these benzothiazoles have greater retention of strength and resiliency and are more resistant to cracking and tearing than those rubbers containing less effective stabilizers.

The substituted benzothiazoles of the invention impart stability to natural fats and oils. Typical compositions include those in which the major component is an edible oil such as menhaden oil, cod oil, babassu oil, safflower oil, caster oil, palm oil, corn oil, olive oil, sesame oil, peanut oil or the like. Fats which may be stabilized by the addition of the substituted benzothiazoles of the invention include oleomargarine, lard, butter, beef tallow, animal fat and hydrogenated vegetable shortening.

In general, the stabilized compositions containing the novel substituted benzothiazoles herein described contain only the amount of any particular compound needed to stabilize the organic material against oxidative deterioration. The actual amount employed will be dependent upon the particular stabilizer used, the nature of the organic material to be protected and the conditions to which it is to be subjected. It has been found that concentrations of the substituted benzothiazole from about 0.001% to about 5% by weight are satisfactory, although concentrations of from about 0.01% to about 1% by weight are preferred. In most materials, such as petroleum fractions, e.g., lubricating oil, concentrations of from about 0.1% to about 0.7% are especially useful.

To illustrate the preparation and uses of the novel benzothiazoles of the invention, the following examples are given. It should be understood that these examples are merely illustrative, and are not to be regarded as limitations, as the teachings thereof may be varied as will be apparent to one skilled in this art. In the examples, all proportions are by weight unless otherwise stated.

EXAMPLE I

A solution of 2.8 grams of 75% $H_2SO_4$ in 75 ml. of tert-butyl alcohol was added to a mixture of 5.0 grams of 3,5-di-tert-butyl-4-hydroxybenzyl alcohol and 3.7 grams of 2-mercaptobenzothiazole. The system was stirred at room temperature for 2 hours, during which time fine yellow crystals precipitated from solution. The pale yellow product was washed with tert-butyl alcohol and then with water. Recrystallization from isooctane gave 6.9 g. of pale yellow crystals, M.P. 140.5–141.8° C. The infrared spectrum of the product indicated the presence of a hindered phenolic hydroxyl group.

The product proved to be 2-(3,5-di-tert-butyl-4-hydroxybenzylthio)benzothiazole, whose analysis gave the following results.

|  | Observed | Calculated |
| --- | --- | --- |
| Percent carbon | 68.5 | 68.5 |
| Percent hydrogen | 7.1 | 7.3 |
| Percent sulfur | 16.7 | 16.6 |

EXAMPLE II

Employing the method of the previous example, when 0.1 mole of 3,5-diisopropyl-4-hydroxybenzyl alcohol is reacted with 0.1 mole of 2-mercaptobenzothiazole in the presence of $H_2SO_4$ at about 25° C., a good yield of 2-(3,5-diisopropyl - 4-hydroxybenzylthio)benzothiazole is obtained.

EXAMPLE III

As in the previous example, when 0.12 mole of 3-methyl-5-tert-amyl-4-hydroxybenzyl alcohol is reacted with 0.1 mole 2-mercapto-5-methylbenzothiazole in tert-butyl alcohol in the presence of 4% of sulfuric acid at about 20° C., a good yield of 2-(3-methyl-5-tert-amyl-4-hydroxybenzylthio)-5-methylbenzothiazole is obtained.

EXAMPLE IV

Following the method of Example II, 3,5-di-tert-butyl-4-hydroxybenzyl alcohol is reacted with 6-nitro-2-mercaptobenzothiazole in the presence of $H_2SO_4$ to obtain a good yield of 2-(3,5-di-tert-butyl-4-hydroxybenzylthio)-6-nitrobenzothiazole.

EXAMPLE V

Employing the method of the previous example, when 0.2 mole of 3,5-di-tert-butyl-4-hydroxybenzyl alcohol is reacted with 0.18 mole of 5-chloro-2-mercaptobenzothiazole in the presence of 3% of sulfuric acid, a good yield of 2-(3,5-di-tert-butyl-4-hydroxybenzylthio)-5-chlorobenzothiazole is obtained.

EXAMPLE VI

When samples of natural rubber, each containing 1% of the substituted benzothiazoles of Examples II and III, are subjected to exposure to sunlight and oxygen, such samples have considerably more resistance to cracking, checking and tearing than rubber samples containing no stabilizing agents.

EXAMPLE VII

The superior results obtained by the use of the 2-(3,5-dialkyl-4-hydroxybenzylthio)-benzothiazoles of the invention are demonstrated by results of evaluations of the stabilizer in a white mineral oil using the Dornte Stability Test (National Petroleum News, September 17, 1941, pages R 294–296) as shown in Table I.

*Table I*

[Temperature 150° C.; Fe catalyst; 0.5% w. of stabilizer]

Stabilizer: Induction period, hours
   None _____ 0–1
   4-(3,5-di-tert-butyl-4-hydroxybenzylthio)-
     2,6-di-tert-butyl phenol _____ 29
   bis(3,5-di-tert-butyl-4-hydroxyphenyl)-
     methane _____ 22.5
   2-(3,5-di-tert-butyl-4-hydroxybenzylthio)-
     benzothiazole _____ 36

We claim as our invention:
1. The compounds having the structure

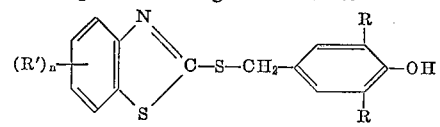

wherein R is alkyl of 1 to 20 carbon atoms, R' is selected from the group consisting of nitro, halogen and alkyl of 1 to 8 carbon atoms, and $n$ is a whole number from 0 to 4.

2. 2-(3,5-dialkyl-4-hydroxybenzylthio)benzothiazole.

3. 2-(3,5-di-tert-butyl-4-hydroxybenzylthio)benzothiazole.

4. The composition consisting essentially of an organic material normally subject to oxidative deterioration containing a stabilizing amount of the benzothiazole compound having the structure

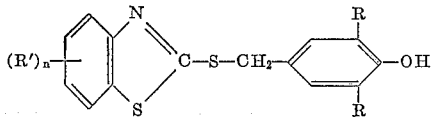

wherein R is alkyl 1 to 20 carbon atoms, R' is selected from the group consisting of nitro, halogen and alkyl of 1 to 8 carbon atoms, and $n$ is whole number from 0 to 4.

5. The composition of claim 4 wherein the benzothiazole compound is 2-(3,5-dialkyl-4-hydroxybenzylthio)-benzothiazole.

6. The composition of claim 4 wherein the benzothiazole compound is 2-(3,5-di-tert-butyl-4-hydroxybenzylthio)-benzothiazole.

7. The composition consisting essentially of a hydrocarbon lubricating oil normally subject to oxidative deterioration containing a stabilizing amount of the benzothiazole compound having the structure

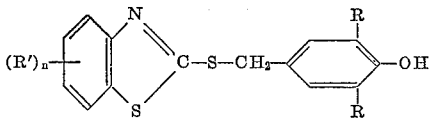

wherein R is alkyl of 1 to 20 carbon atoms, R' is selected from the group consisting of nitro, halogen and alkyl of 1 to 8 carbon atoms, and $n$ is a whole number from 0 to 4.

8. The composition of claim 7 wherein the benzothiazole compound is 2-(3,5-dialkyl-4-hydroxybenzylthio)-benzothiazole.

9. The composition of claim 7 wherein the benzothiazole compound is 2-(3,5-di-tert-butyl-4-hydroxybenzylthio)-benzothiazole.

10. The composition consisting essentially of a polyolefin elastomer normally subject to oxidative deterioration containing a stabilizing amount of the benzothiazole compound having the structure

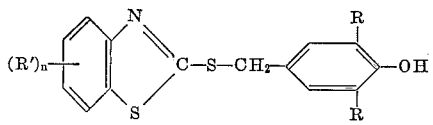

wherein R is alkyl of 1 to 20 carbon atoms, R' is selected from the group consisting of nitro, halogen and alkyl of 1 to 8 carbon atoms, and $n$ is a whole number from 0 to 4.

11. The composition of claim 10 wherein the benzothiazole compound is 2-(3,5-di-tert-butyl-4-hydroxybenzylthio)-benzothiazole.

References Cited by the Examiner
UNITED STATES PATENTS

| | | | |
|---|---|---|---|
| 2,280,716 | 4/42 | Paulsen et al. | 252—402 X |
| 2,616,871 | 11/52 | Newby | 260—800 X |
| 3,049,509 | 8/62 | Hardy et al. | 260—45.8 |
| 3,085,003 | 4/63 | Morris | 252—52 |

DANIEL E. WYMAN, *Primary Examiner.*